United States Patent [19]
Gomez

[11] Patent Number: 5,393,320
[45] Date of Patent: Feb. 28, 1995

[54] LEACHING PROCESS FOR NICKEL COBALT AND MANGANESE ORES

[75] Inventor: Rodolfo A. Gomez, Urrbrae, Australia

[73] Assignee: RMG Services Pty. Ltd., Australia

[21] Appl. No.: 216,965

[22] Filed: Mar. 24, 1994

[30] Foreign Application Priority Data

Mar. 26, 1993 [AU] Australia ............... PL8010

[51] Int. Cl.⁶ .................. C01G 53/00; C22B 3/00
[52] U.S. Cl. ................... 75/10.67; 75/10.13; 75/738; 423/150.1
[58] Field of Search ........... 75/10.13, 738, 10.67; 423/150.1

[56] References Cited

U.S. PATENT DOCUMENTS

| | | | |
|---|---|---|---|
| 4,311,520 | 1/1982 | Kruesi ............... | 75/10.13 |
| 4,541,868 | 9/1985 | Lowenhaupt ......... | 423/150.1 |
| 4,541,994 | 9/1985 | Lowenhaupt et al. ... | 423/150 |
| 4,906,290 | 3/1990 | Worner ............... | 75/10.13 |

FOREIGN PATENT DOCUMENTS 50340785 11/1985 Australia.

OTHER PUBLICATIONS

Engineering and Mining Journal, vol. 160, No. 12, pp. 84–92.

Primary Examiner—Peter D. Rosenberg
Attorney, Agent, or Firm—Evenson, McKeown, Edwards & Lenahan

[57] ABSTRACT

A process for the extraction of nickel, cobalt and manganese from slurries of their ores such as laterite, saprolite or manganese nodules in an aqueous acid solution while irradiating the solution with electromagnetic energy such as microwave energy. The acid may be hydrochloric acid, sulphurous acid and/or sulphuric acid and the acid solution may be blended with high concentrations of halite and magnesium ions to further control the dissolution of magnesia from the ore. A reactor including electromagnetic wave generators is also included.

15 Claims, 2 Drawing Sheets

LEACHING PROCESS FOR NICKEL COBALT AND MANGANESE ORES

FIELD OF THE INVENTION

This invention relates to a leaching process for the extraction of metal from ores and more particularly processes for the recovery of nickel, cobalt or manganese from their ores.

Nickel, cobalt and manganese occur in a number of ores and in particular in laterite ores, saprolite ores and manganese nodules.

BRIEF DESCRIPTION OF THE PRIOR ART

The art of extracting nickel and cobalt from laterite ores by sulphuric acid leaching at high temperatures and pressures followed by neutralizing the pregnant solution has been the subject of several United States Patent specifications. These patent specifications are based upon the commercial operation at Moa Bay, Cuba where a low magnesia laterite ore is treated for nickel and cobalt using sulphuric acid at high pressure and temperature. The Moa Bay process has been described in detail in an article in 'Engineering and Mining Journal', Volume 160, No 12, December 1959, pages 84-92 and also in the book 'Winning of Nickel' by J. R. Boldt, Jnr, Van Nostrand, 1967, pages 437-449.

Most nickel laterite ores are relatively high in magnesia (greater than 1.7% MgO) and are not successfully treated by the process used at Moa Bay. Applying acid leaching treatment at high temperature and pressure to high magnesia laterite ores results in sub-economic extraction, high acid consumption, and a leachate which contains too much magnesium and other salts making liquid—solid separation difficult due to scaling.

U.S. Pat. No. 4,541,868 assigned to Californian Nickel Corporation discusses the leaching of laterite ores for extraction of nickel and cobalt. It proposes the use of sulphuric acid at low temperature and then heating of the mixture for recovery of metal value. It proposes subsequent recovery of metals from a leach solution by addition of a base to precipitate the metal.

The disadvantage of the process disclosed in this specification is that ores which have a high magnesia content consume the sulphuric acid in the formation of sulphate which precipitates out and can cause problems.

U.S. Pat. No. 4,541,994 assigned to Californian Nickel Corporation discusses the acid leaching of nickel ores at temperatures from 20 C. to about 200 C. and pressures from about atmospheric to about 200 psig to form a leach liquor, a coarse leach residue and a fines fraction. It is found that the fines fraction is richer in nickel and cobalt and can be subsequently treated by a main leaching step for extraction of the nickel and cobalt. The coarse leach residue fraction is found to be enriched in magnesia and can be discarded.

By this means high magnesia problems are avoided in the main leaching step but it does require an extra separation step and this process would not be suitable where there is finally divided magnesia particles present.

U.S. Pat. No. 4,311,520 discusses the recovery of nickel, cobalt or manganese from their oxides or silicates in a solid phase reaction in the presence of a reducing gas such as hydrogen. The ore may be laterite saprolite or manganese modules. Heating of the ore is provided by means of electromagnetic radiation and temperatures of up to 500 C. to 800 C. are necessary for a solid/gas or solid/solid reaction to occur.

This is a solid phase reaction and is very energy intensive and hence would be uneconomic in practice.

Australian Patent Specification No. 50,340/85 discusses a process for recovering nickel values by leaching of the ore with a strong acid. The acidic pregnant leach liquor is then mixed with an immiscible liquid such as a kerosene and benzene mixture whereby the kerosene and benzene mixture extracts the solute from the leach solution. This disclosure concerns applying microwave energy to the mixture of pregnant leach solution and the immiscible liquid to enhance the separation of the two liquids after the extraction of the solute by the immiscible liquid.

None of these patent specifications face the problem of acid leaching of nickel, cobalt or manganese ores in which there is a high magnesia content and it is the object of this invention to provide a process which will overcome one or more of the above problems.

It is another object of the present invention to provide an apparatus for the pressure leaching of slurries of ores.

It is a further object to provide a process which is a useful alternative to existing processes.

BRIEF SUMMARY OF THE INVENTION

The invention is therefore said to reside in a process for the extraction of nickel, cobalt or manganese from an ore containing these metals including the steps of leaching a slurry of the ore in an aqueous acid solution while irradiating the slurry and solution with electromagnetic energy.

It will be seen that by this process the leaching is in an aqueous phase and is enhanced by the irradiation of the slurry with electromagnetic energy during the leaching step.

This is different than the process discussed in Australian Patent No 50,340/85 where the electromagnetic energy is used in the subsequent solvent extraction step and different from that disclosed in U.S. Pat. No. 4,331,520 which suggests carrying out the process in a solid phase.

In a preferred form of the invention the electromagnetic energy may be in the microwave frequency of from 800 Megahertz to 25,000 Megahertz and preferably is around 2,450 Megahertz.

The aqueous acid solution may be sulphuric acid or a mixture of sulphuric acid with hydrochloric acid and/or sulphurous acid. The concentration of sulphuric acid may be from 0.12 to 0.36 tonnes of acid per tonne of ore, the concentration of hydrochloric acid may be 0 to 0.16 tonnes per tonne of ore and the concentration of sulphurous acid may be from 0 to 0.2 tonnes per tonne of ore. The sulphurous acid may be added in the form of sulphur dioxide which may be bubbled into the aqueous slurry.

The aqueous acid solution may further include halite in for instance the form of sodium chloride in concentrations of up to saturation of the halite in the solution. The concentration of halite may be in the range of from 0 to 30% by weight of the acid solution. Magnesium as a sulphate may be maintained in the range of from 40 to 100 grams per liter during leaching by recycling the barren leach solution. The halite acts to reduce the solubility of the magnesia in the acid leach solution thereby preventing problems of scaling and causing problems with liquid—solid separation.

The leaching step may be carried out at a temperature of from 40 C. to 300 C. The leaching step may be carried out at pressures above atmospheric pressure and such leaching may be carried out in a pressure vessel wherein the pressure in the pressure vessel ranges from 1–60 bars.

The aqueous acid solution may further include copper ions to catalyze the leaching step.

In a further form the invention may be said to reside in a reactor for the leaching of nickel, cobalt and manganese ores comprising a vessel including a plurality of electromagnetic wave generators and wave guides to direct electromagnetic energy into the interior of the reactor vessel.

The reactor is preferably a pressure vessel.

Laterite ores are complex materials with varying chemical and physical characteristics. The present invention includes the application of electromagnetic energy irradiating a mixture of fine laterite ore and leach solution during leaching, however, the leach solution may vary from just an aqueous sulphuric acid for low magnesia laterite ores (less than 1.7% magnesia) to a mixture of sulphuric and hydrochloric acids in a solution with high concentrations of halite and magnesium salts and sulphur dioxide with possibly catalysts such as copper ions for leaching higher magnesia laterite ores.

It will be understood that after the leaching stage of the present invention the leach liquor can be clarified by known techniques and then passed to a recovery stage. In the recovery stage known techniques such as solvent extraction or precipitation using hydrogen sulphide may be used to recover metal values.

DETAILED DESCRIPTION

This then generally describes the invention but to assist with understanding of the invention reference will now be made to the specific examples of the process of the invention and to apparatus suitable for carrying out the invention.

The ores to which this present invention are applicable are for instance laterite ores, saprolite ores and manganese nodules. Typical analyses of such ores are as follows:

| ANALYSIS OF NICKEL LATERITE ORES | | | |
|---|---|---|---|
| | HIGH MAGNESIA (Nonoc Island) | | LOW MAGNESIA (Moa Bay) |
| Content | Laterite | Saprolite | Laterite |
| Ni, % | 1.77 | 2.10 | 1.35 |
| Co, ppm | 1149 | 272 | 1460 |
| Cr, % | 1.58 | 0.447 | 1.98 |
| Mn, % | 0.538 | 0.149 | 0.80 |
| CaO, % | 0.044 | 0.166 | — |
| $Al_2O_3$, % | 4.51 | 0.897 | 8.50 |
| $Fe_2O_3$, % | 48.8 | 12.8 | 67.8 |
| $SiO_2$, % | 15.8 | 35.8 | 3.7 |
| MgO, % | 9.96 | 27.9 | 1.7 |
| Specific Gravity | 3.31 | 2.72 | 3.3 |

| TYPICAL ANALYSIS OF MANGANESE NODULES FROM THE PACIFIC OCEAN | |
|---|---|
| Nickel, % | 0.20 |
| Copper, % | 0.15 |
| Cobalt, % | 0.023 |
| Manganese, % | 3.60 |

It will be noted that the ore from Moa Bay is low in magnesia (1.7%) while both forms of the ore from Nonoc Island are much higher in magnesia and would not be able to be treated by the process used at Moa Bay.

The following examples show laboratory scale tests of laterite and saprolite ores first of all without the use of microwave radiation and then subsequently with microwave radiation.

EXAMPLE 1

About 25 leach tests were carried out on the following laterite ore samples using a standard 2 liter autoclave at temperature between 230° C. to 250° C. with the solution saturated with halite and magnesium salts:

| | Laterite Ore | Saprolite Ore |
|---|---|---|
| Ni, % | 1.77 | 2.10 |
| Co, ppm | 1149 | 272 |
| Cr, % | 1.58 | 0.447 |
| Mn, ppm | 5381 | 1492 |
| CaO, % | 0.044 | 0.166 |
| $Al_2O_3$, % | 4.51 | 0.897 |
| $Fe_2O_3$, % | 48.8 | 12.8 |
| $SiO_2$, % | 15.8 | 36.8 |
| MgO, % | 9.96 | 27.9 |
| Test No. | 21 | 19 |
| $H_2SO_4$, tonnes acid/tonne ore | 0.196 | 0.196 |
| HCl, tonnes acid/tonne ore | 0.120 | 0.120 |
| Nickel Extraction, % | 83.6 | 38.5 |
| Cobalt Extraction, % | 85.2 | 53.5 |
| Manganese Extraction, % | 10.0 | 56.3 |

Extraction of nickel and cobalt from the laterite ore is nearly economic but the extractions from the saprolite ore were sub-economic.

EXAMPLE 2

Four tests each were conducted on the laterite and saprolite ore as above using a 2 liter polypropylene beaker in a domestic microwave oven at 2,450 megahertz frequency with the temperature of the slurry in the beaker at about 104° C. The leach conditions and results are as follows:

| | Laterite Ore | Saprolite Ore |
|---|---|---|
| $H_2SO_4$, tonnes acid/tonne ore | 0.188 | 0.188 |
| HCl, tonnes acid/tonne ore | 0.025 | 0.025 |
| $MgSO_4$ | Near Sat. | Near Sat. |
| NaCl | Near Sat. | Near Sat. |
| Nickel Extraction, % | 41.33 | 71.77 |
| Cobalt Extracton, % | 35.44 | 56.41 |
| Manganese Extraction, % | 35.21 | 76.63 |

The result for the saprolite ore shows that even with the much lower acid addition and the temperature of about 104° C., the extraction of nickel improved to 71.77% compared to the 38.5% extraction in the conventional high temperature and pressure leach conditions. As expected, the extraction of nickel for the laterite ore was lower than the conventional because the temperature in the microwave test was too low to prevent the dissolution of the iron.

EXAMPLE 3

A further test were carried out at about 145° C. using 125 ml. FEP Erlenmeyer flasks to gauge the effect of higher temperature and the effect of sulphur dioxide. The low temperature and the difficulty of mixing the ore in the test and the leach solution did not produce economic extractions of the nickel and the cobalt but some indications of the effect of reagent additions were given. The best nickel extraction on the saprolite ore was 45.9% (Cobalt 40.9%) when using sulphuric acid and hydrochloric acid in a magnesium sulphate solution while the best nickel extraction in the laterite ore was 47.1% (cobalt 69.2% extraction) when only sulphuric acid was used with sulphur dioxide in a solution of halite and magnesium sulphate.

It will be seen that in Example 1 efficient extraction of nickel and cobalt from the laterite ore was possible, however, with the saprolite ore which had significant magnesium oxide or magnesia concentration very poor extraction was obtained. By the use of microwave radiation in Example 2 it can be seen that a much better extraction of nickel from the saprolite ore is obtained even though less acid was used and the temperature at which the reaction was carried out was considerably less.

It will be seen that this invention discloses advantages in the use of electromagnetic radiation to enhance extraction rates of metals from their ores and in particular the extraction of nickel, cobalt and manganese using enhancement with microwave radiation.

The invention will now be further discussed with reference to the drawings included with this patent specification which show possible commercial scale reactors suitable for the process of the present invention and an example of a simple commercial flow sheet using the process of the present invention for laterite ores. It will be understood by those skilled in the art that this flowsheet could be adapted for saprolite ore, laterite ore or manganese nodules.

Figure 1A:
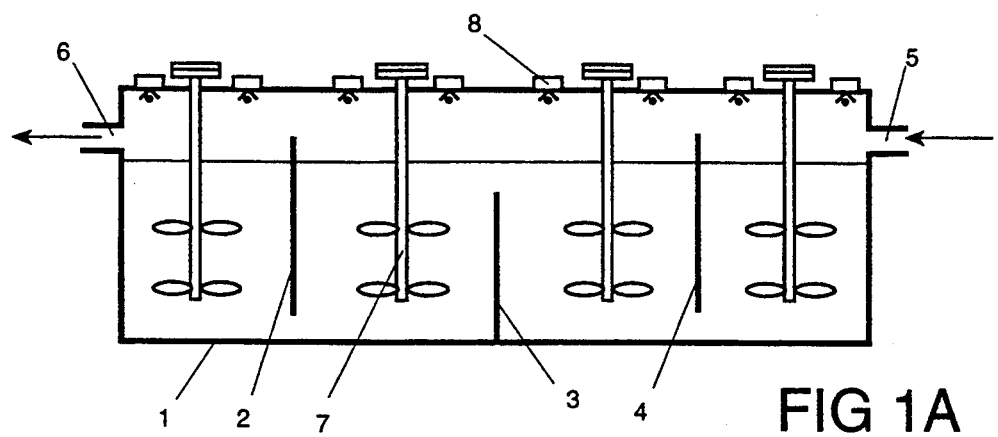
FIGS. 1A and 1B show a schematic diagram for a reactor for the leaching of ores containing nickel, cobalt or manganese.
Figure 1B:
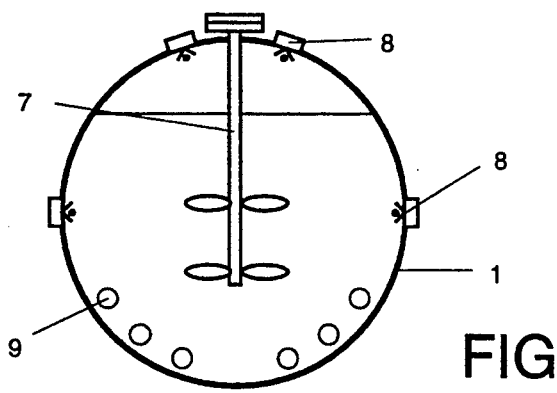

Now looking more closer to the drawings and in particular FIGS. 1A and 1B there is depicted a pressure vessel 1 for carrying out the leaching of a slurry of ores containing nickel, cobalt and manganese. The vessel includes baffles 2, 3 and 4 to provide a convoluted flow path for slurry through the reactor. The preheated and finely ground slurry enters through pipe 5 at one end of the reactor along with aqueous acid leach solution and exits as a pregnant leach liquor and a slurry residue through pipe 6. Agitators 7 are provided to keep the slurry in suspension. Some acid may be added directly into the reactor.

Electromagnetic wave generators 8 at the top and sides of the reactor vessel provide electromagnetic radiation, in this embodiment in the microwave region of the electromagnetic spectrum, into the vessel. Cooling tubes 9 within the vessel allow for cooling when the reaction temperature tends to go too high due to the electromagnetic radiation heating of the leach solution.

The electromagnetic radiation may be introduced into the reactor via a wave guide through a material which is transparent to electromagnetic waves of that frequency such as a borosilicate glass or polytetrafluoroethylene (Teflon).

Figure 2:
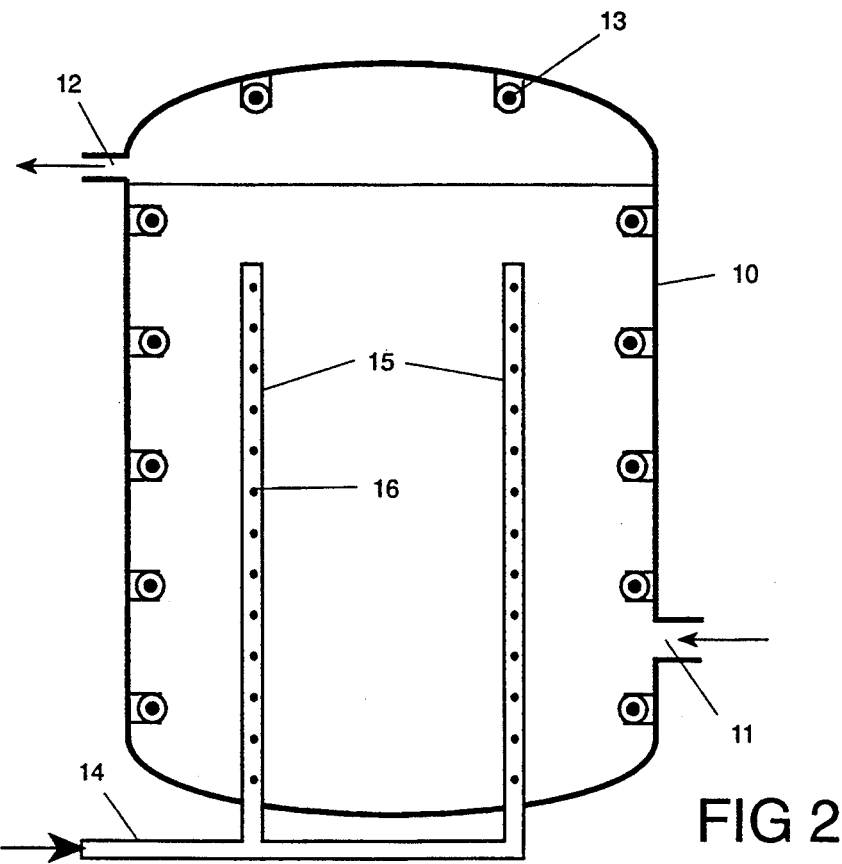
FIG. 2 shows an alternative reactor for the leaching of such ores.

FIG. 2 shows an alternative embodiment of a vertical cylindrical reactor for the electromagnetic leaching of nickel laterite ores. In this embodiment the reactor 10 has a slurry inlet 11 and a leach slurry outlet 12. The aqueous acid solution is also added through the inlet 11 with the preheated slurry but some acid may be added directly into the reactor.

Electromagnetic wave generators 12 are provided at the sides and top of the reactor vessel. Steam is provided through steam inlet 14 into riser tubes 15 and is sparged out through nozzle 16 to provide agitation and heating of the reactor vessel. Similar tubes (not shown) may be provided for addition of sulphur dioxide to the reactor vessel if used. Mechanical agitation may be substituted and cooling coils provided in the reactor vessel.

Figure 3:
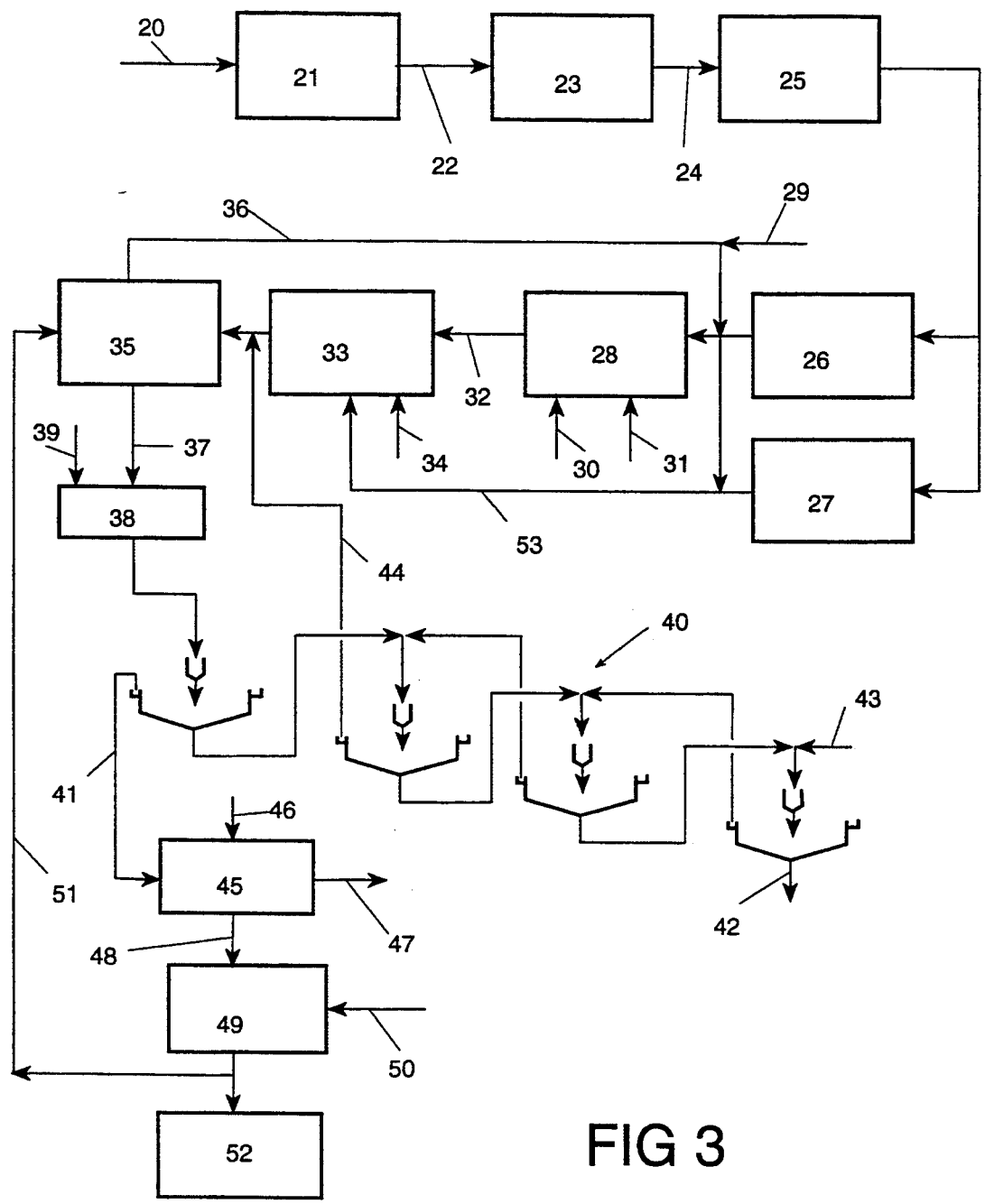
FIG. 3 shows a simple commercial flow sheet using the process of the present invention for laterite ore.

FIG. 3 shows an example of simple commercial flow sheet using the electromagnetic leaching process of the present invention for late rite ores. A similar process may be used for manganese nodules.

Laterite ores enter through line 20 into milling plant 21 where they are finely ground into a slurry with water. The slurry is passed through in line 22 to a thickener and filter 23 and if necessary passed in line 24 to a drier 25. An alternative procedure is to dry the crushed laterite ore with waste heat in combination with a coal, oil or gas heater, and then reduce the size of the ore by dry grinding. The dried ore can be passed to a first store 26 or a second store 27 depending upon whether it is a normal ore to process or any easy ore to process. The normal to treat ore is stored in storage 26 and mixed with the barren leach solution with halite and magnesium sulphate make up 29 and passed to a first pressure leaching stage 28 which may consist of one or several pressure vessels. At this stage 28 some acids 31 are added and sulphur dioxide 30 is added as required and leaching is carried out while irradiating the slurry within the vessel with electromagnetic radiation. The leached slurry and pregnant solution is passed through line 32 to a second pressure leaching stage 33 where further reagents 34 may be added if required along with more slurry from line 53 which supplies the easy to treat ore from store 27 and again leaching is carried out while irradiating the slurry within the vessel with electromagnetic radiation.

This multistage leaching uses the acid more efficiently and reduces the acids to be neutralized prior to the hydrogen sulphide precipitation stage.

The slurry with the pregnant leach solution is then passed to a heat exchanger 35 where the barren leach solution is heated by the products from leaching stages 28 and 33 through line 36. An alternative method to recover the heat in the leaching stages is to mix the barren leach solution with the ore in stores 26 and 27 and pre-heat this feed slurry with the leach products from the stages 28 and 33 in the heat exchanger 35.

Recycling the barren leach solution recycles the halite and the magnesium salts such as magnesium sulphate and magnesium chloride. An alternative is to fully or partially reclaim the halite and magnesium salts from the barren leach solution by multistage evaporation and recycle these to the leach feeds for stages 28 and 33.

The leach slurry and pregnant leach solution is passed through line 37 to pH adjustment stage 38 which is achieved by use of soda ash and limestone entering through line 39. The slurry and leach solution is then passed to a four to six stage thickener process generally shown as 40 from which the clarified pregnant leach solution is extracted through line 41. Residue passes out of the four stage thickener process through line 42. Wash water is provided through line 43. It will be noted that only pregnant leach solution from the first thickener is taken to the final processing stages while the leaner leach liquors are passed through line 44 back to the heat exchanger step.

The pregnant leach solution from the thickener process is passed through line 41 to a hydrogen sulphite precipitation stage 45 where hydrogen sulphide 46 is added and nickel and cobalt sulphides are precipitated and extracted through line 47. These nickel and cobalt sulphides may be sold or further processed to the metal stage by conventional processes.

The spent leach solution 48 is then evaporated in stage 49 using heat 50 from the leach vessels or a cogeneration power plant to remove some of the water so as to increase the concentration of halite and magnesium salts in the spent solution. A proportion is passed back through line 51 as barren leach solution to heat exchanger 35 to be heated by the process leach slurry before being transferred to the pressure leaching stages 28 and 33. The balance goes to solution purification 52 where halite and magnesium salts are recovered for recycling and final liquid goes to waste or manganese recovery.

I claim:

1. A process for the extraction of nickel, cobalt or manganese from ore containing these metals including the steps of leaching a slurry of the ore in an aqueous acid solution while irradiating the slurry and solution with electromagnetic energy.

2. A process as in claim 1 wherein the electromagnetic energy is in the microwave frequency range of from 800 megahertz to 25,000 megahertz.

3. A process as in claim 1 wherein the acid solution is a mixture of one or more of hydrochloric acid, sulphurous acid and sulphuric acid.

4. A process as in claim 3 wherein the concentration of hydrochloric acid in the acid solution is from 0 to 0.16 tonnes per tonne of ore, the sulphurous acid is from 0 to 0.2 tonnes per tonne of ore and the sulphuric acid is from 0.12 to 0.36 tonnes per tonne of ore.

5. A process as in claim 4 wherein the sulphurous acid is added in the form of sulphur dioxide.

6. A process as in claim 1 further including addition of halite to the acid solution.

7. A process as in claim 6 wherein the halite is added in the range of from 0 to 30% weight of halite by weight of the acid solution.

8. A process as in claim 1 wherein a concentration of magnesium as a sulphate is maintained at up to 100 grams per liter in the aqueous acid solution by recycling magnesium sulphate from barren leach solution.

9. A process as in claim 1 wherein the leaching step is carried out at a temperature of from 40° C. to 300° C.

10. A process as in claim 1 wherein the leaching step is carried out in a pressure vessel and the pressure in the vessel is in the range from 1 to 60 bar.

11. A process as in claim 1 further including the addition of copper ions to the solution to catalyze the leaching step.

12. A reactor for the acid leaching of aqueous slurries containing nickel cobalt and manganese comprising a vessel including a plurality of electromagnetic wave generators and wave guides to direct electromagnetic energy into the interior of the reactor.

13. A reactor as in claim 12 wherein the vessel is a pressure vessel.

14. A process as in claim 1, wherein nickel is extracted.

15. A process as in claim 2, wherein the frequency is about 2,450 megahertz.

* * * * *